United States Patent [19]

Takahashi et al.

[11] Patent Number: 4,497,198
[45] Date of Patent: Feb. 5, 1985

[54] KNOCKING SENSOR

[75] Inventors: Juhei Takahashi; Kenzo Miura; Shogo Asano; Kunio Sugiyama, all of Yokohama; Kiyokane Kaji, Toyota; Jun Ohta, Aichi, all of Japan

[73] Assignees: Matsushita Electric Industrial Co., Ltd., Osaka; Toyota Jidosha Kabushiki Kaisha, Aichi, both of Japan

[21] Appl. No.: 514,853

[22] Filed: Jul. 18, 1983

Related U.S. Application Data

[63] Continuation-in-part of Ser. No. 276,859, Jun. 24, 1981, abandoned.

[51] Int. Cl.$^3$ ............................................. G01L 23/22
[52] U.S. Cl. ........................................................ 73/35
[58] Field of Search ............................ 73/35, 651, 654; 310/329

[56] References Cited

U.S. PATENT DOCUMENTS

| | | | |
|---|---|---|---|
| 4,096,735 | 6/1978 | Huntzinger et al. | 73/35 |
| 4,161,665 | 7/1979 | Buck et al. | 73/35 X |
| 4,193,647 | 3/1980 | Guess | 73/35 X |
| 4,343,187 | 8/1982 | Kaji | 73/35 |
| 4,374,472 | 2/1983 | Nishimura | 73/35 |

Primary Examiner—James J. Gill
Attorney, Agent, or Firm—Pollock, VandeSande & Priddy

[57] ABSTRACT

A knocking sensor comprises a casing for receiving a pickup assembly including a transducer, which produces an electrical signal in accordance with engine vibrations, and a connector having at least a single pin electrically connected to the transducer. The casing comprises a threaded projection to be screwed in a screw hole of an engine, and a nut-like periphery to be rotated by a tool. The knocking sensor can be attached to the engine by means of an impact wrench, by rotating the nut-like portion. A plug connected to one end of a shielding code can be plugged in the connector to make an electrical connection between the transducer and a signal processing circuit after the knocking sensor has been attached to the engine, and therefore, the shielding code is prevented from being damaged during installation of the knocking sensor. The use of an impact wrench ensures secure attachment of the sensor, and reduces the installation time.

11 Claims, 9 Drawing Figures

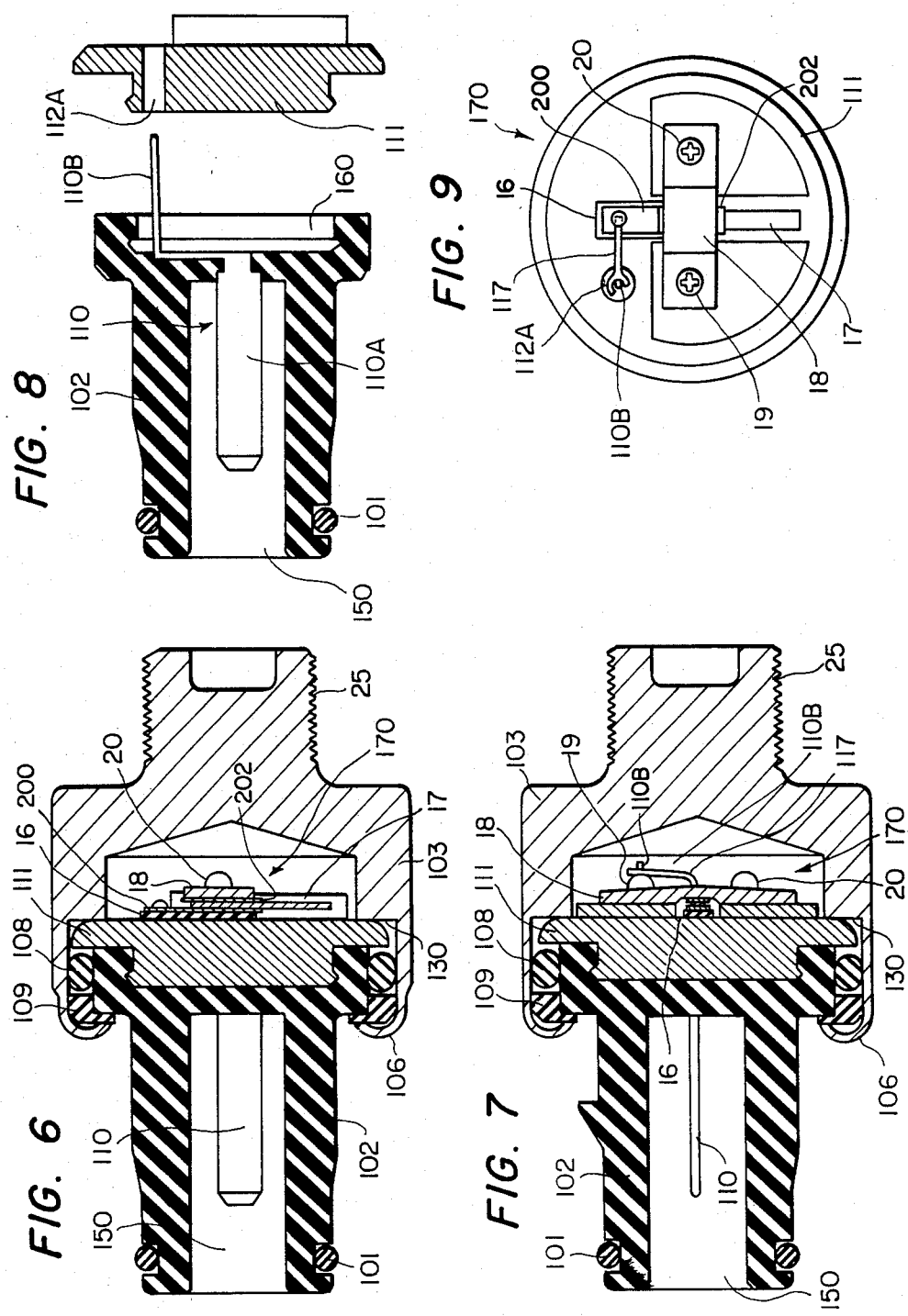

KNOCKING SENSOR

This application is a continuation-in-part of application Ser. No. 276,859, filed June 24, 1981, now abandoned.

BACKGROUND OF THE INVENTION

This invention relates generally to knocking sensors for producing an output electrical signal indicative of the intensity of knocking which occurs in an internal combustion engine, and more particularly, the present invention relates to improvement in structure of knocking sensors, and in the method for manufacturing the same.

In internal combustion engines of motor vehicles, for instance, undesirable knocking sometimes occurs, causing the durability of the engine to deteriorate, and resulting in more fuel consumption. Such knocking can be prevented by controlling the ignition timing as well as the air to fuel ratio of the mixture supplied to the engine. In order to control the engine in this way, it is necessary to accurately detect the state of knocking. A knocking sensor is a kind of a pickup which is attached to the engine casing, and is used to detect the waveform of the engine vibrations. The output signal of the knocking sensor is fed to a suitable circuit in which the peak frequency in the spectrum of the vibration frequencies will be detected. The peak frequency has a variation depending on the sort and size of the engine, and usually resides in a range between 6 and 9 KHz. Since knocking sensors are required to pick up knocking vibrations around the engine under a condition in which S/N of the objective vibrations is very poor, it is necessary that a sharp resonance frequency of the sensor equals the peak frequency of the engine vibrations. The sharpness of the resonance frequency of the conventional knocking sensors is usually set to a value between 10 and 100 because of an upper limit due to the transient characteristic, and because of a lower limit due to a simple cantilever beam structure of the vibrator.

The above-described customary knocking sensors are attached, in use, to the engine casing for picking up knocking vibrations. In order to attach the sensor to the engine, the sensor has a threaded projection which will be screwed in a screw hole of the engine. The sensor also has a nut-like periphery. so that this nut-like portion is gripped by a suitable tool, such as a torque wrench, to rotate and therefore, to screw the sensor. However, conventional knocking sensors comprise a shielding cable or code which is fixedly attached to a pickup including a transducer, of the sensor. For this reason, an impact wrench cannot be used for screwing a conventional knocking sensor. Namely, if a conventional knocking sensor were rotated by an impact wrench, the shielding code would be damaged due to high speed rotation. Furthermore, the shielding code is apt to coil around the shaft of the impact wrench, obstructing the installing operation.

SUMMARY OF THE INVENTION

The present invention has been developed in order to remove the above-described disadvantages and drawbacks inherent to the conventional knocking sensors.

It is, therefore, a primary object of the present invention to provide a knocking sensor which can be attached by means of an impact wrench, so that installation of the knocking sensor can be securely performed within a short period of time.

According to a feature of the present invention, a knocking sensor has a connector for receiving a plug attached to the end of a shielding code. The plug is detachable from the connector, and therefore, the sensor can be screwed to be attached to the engine casing before the plug is plugged in the connector.

Another object of the present invention is to provide methods for manufacturing such a knocking sensor having a connector.

In accordance with the present invention, there is provided a knocking sensor for converting engine vibrations into an electrical signal comprising: (a) a casing having a threaded portion engagable with an screw hole of said engine, and a nut-like portion so that said casing can be rotated; (b) a pickup assembly received in the bore of said casing, and having a transducer for converting vibrations into an electrical signal; (c) a connector engaged with said casing, and having at least one conductive pin connected to one electrode of said transducer; and (d) means for fastening said connector to said casing.

In accordance with the present invention there is also provided a method of manufacturing a knocking sensor attachable to an engine for converting engine vibrations into an electrical signal, said method comprising the steps of: (a) placing a pickup assembly having a transducer attached to a disk-like base, on a shoulder portion made in a bore of a casing, which has a threaded portion to be screwed in a screw hole of said engine and a nut-like portion, said transducer being placed on one side of said base, said pickup assembly having first and second terminals respectively connected to the electrodes of said transducer; (b) inserting a first cylindrical ring in said bore in such a manner that one end of said first cylindrical ring is in contact with said base; (c) inserting a second cylindrical ring in said bore inside said first cylindrical ring; (d) making electrical connections between conductors of a connector and said terminals of said pickup assembly; (e) engaging said connector with said casing; (f) inserting air-tightening means between the outer surface of said connector and the inner surface of said casing; and (g) bending a plurality of bendable portions which are integrally formed with said casing, for fastening said connector to said casing.

In accordance with the present invention, there is further provided a method of manufacturing a knocking sensor attachable to an engine for converting engine vibrations into an electrical signal, said method comprising the steps of: (a) attaching a pickup assembly to a connector in such a manner that a pin of said connector penetrates through a through-hole made in a conductive base of said pickup assembly having a transducer placed on one surface of said base, said pin being electrically insulated from said conductive base; (b) fitting said connector with said pickup assembly into a bore of a casing having a threaded portion to be screwed in a screw hole of said engine and a nut-like portion; (c) inserting air-tightening means between the outer surface of said connector and the inner surface of said casing; and (d) bending a plurality of bendable portions which are integrally formed with said casing, for fastening said connector to said casing.

BRIEF DESCRIPTION OF THE DRAWINGS

These and other objects and features will become more readily apparent from the following detailed description of the preferred embodiments taken in conjunction with the accompanying drawings in which:

FIGS. 6 and 7 are cross-sectional views of a second embodiment of the knocking sensor according to the present invention;

FIG. 8 is a partial cross-sectional view of the knocking sensor of FIGS. 6 and 7, showing the relationship between the connector and the base thereof; and FIG. 9 is a top plan view of the base of FIG. 8.

In the drawings, the same or corresponding elements are designated at like numerals.

DETAILED DESCRIPTION OF THE INVENTION

Prior to describing the embodiments of the present invention, the aforementioned conventional knocking sensor will be further discussed with reference to FIGS. 1 and 2 for a better understanding of the objects and features of the present invention.

Figure 1:
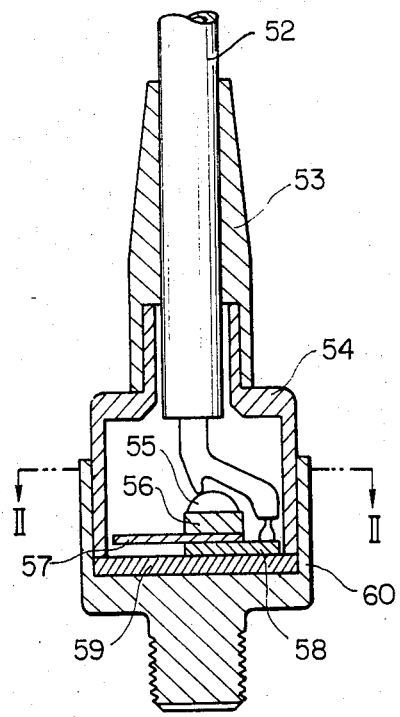
FIG. 1 is a cross-sectional view of a conventional knocking sensor.
Figure 2:
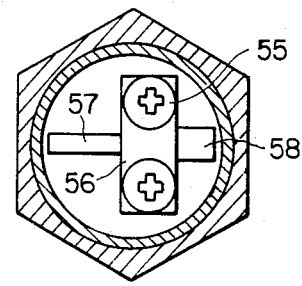
FIG. 2 is a cross sectional view of the conventional knocking sensor of FIG. 1 taken along the line II—II'.
Figure 3:
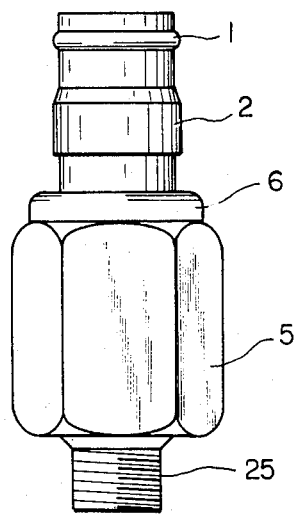
FIG. 3 is a side view of a first embodiment of the knocking sensor according to the present invention.

FIGS. 1 and 2 show a conventional knocking sensor which is arranged to be attached to an internal combustion engine. The knocking sensor comprises a shielding wire 52, which will be connected to a signal processing circuit (not shown), a rubber bushing 53 for receiving an end portion of the shielding wire 52, a cap 54 connected to the bushing 53, and a casing 60 to which one end of the cap 54 is telescopically engaged. The reference numeral 59 is a base for carrying a pickup formed by a substrate 58, a ceramic element 57, an element holder 57, and screws 55. The above-mentioned various elements of the pickup are fixed by means of the screws 55 on the base 59, and the pickup is positioned in a bore defined by the cap 54 and the casing 60. As shown, one end of the casing 60 constitutes a 14 projection whose outer surface is threaded, so that the knocking sensor can be screwed to a given screw hole made in the engine casing. The casing 60 has a shape of a nut as shown in FIG. 3 so that the nut-like portion of the sensor will be rotated by a suitable tool, such as a torque wrench, to install the sensor on the engine. However, as decribed in the above, since the sensor comprises the shielding wire 52 which is fixedly connected to the pickup in the sensor, an impact wrench cannot be applied on installation. Furthermore, when it is intended to replace the sensor with another, not only the sensor proper but also the shielding wire have to be taken out. In addition, as shown in FIG. 1, since the base 59 is merely supported by the cap 54 which may be inserted into the casing 60 under pressure, the base 59 is apt to be unsteady in the casing 60 due to variations in inserting operation.

Reference is now made to FIG. 3 which shows a schematic side view of the first embodiment of the knocking sensor according to the present invention. The first embodiment sensor generally comprises a casing 5 and a connector 2 which is telescopically engaged with the casing 5. The casing 5 takes a form of a polyhedron, namely, the casing has a nut-like periphery so as to be rotated by a suitable tool. One end of the casing 5 projects in the direction of the center axis of the casing 5, and this projected portion, which is indicated at a reference 25, has a threaded outer surface so that the knocking sensor will be screwed into a screw hole made in the engine casing for receiving engine vibrations.

The casing 5 has a bendable portion 6 at its other end, which bendable portion 6 will be bent inward after the connector 2 is engaged with the casing 5 as will be described hereinlater. The reference 1 indicates an O-ring attached to the connector 2.

Figure 5:
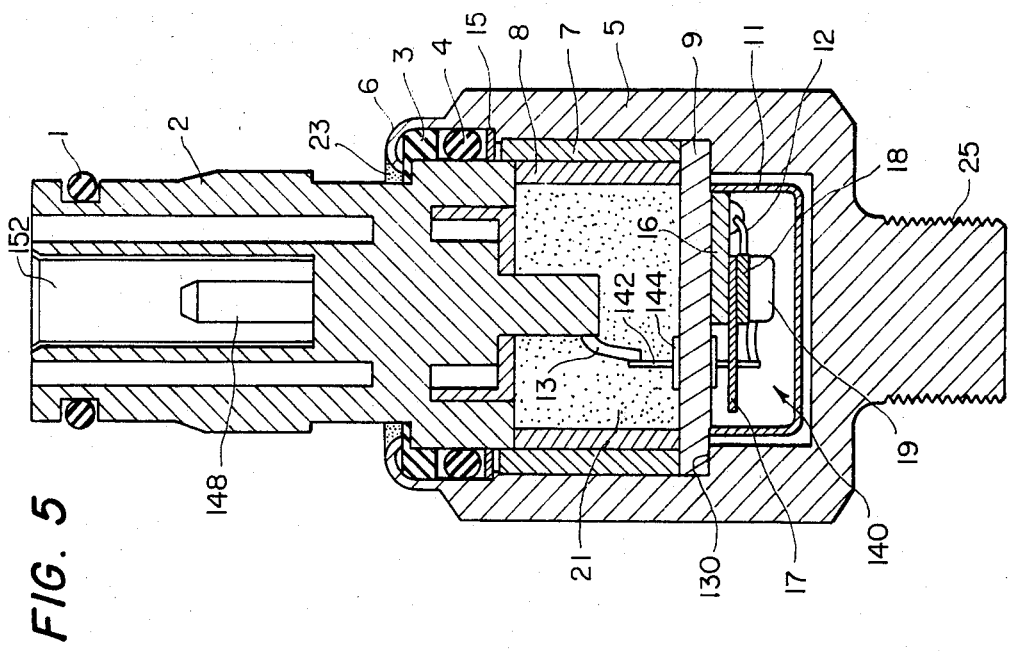
FIGS. 4 and 5 are cross-sectional views of the knocking sensor of FIG. 4.
Figure 4:
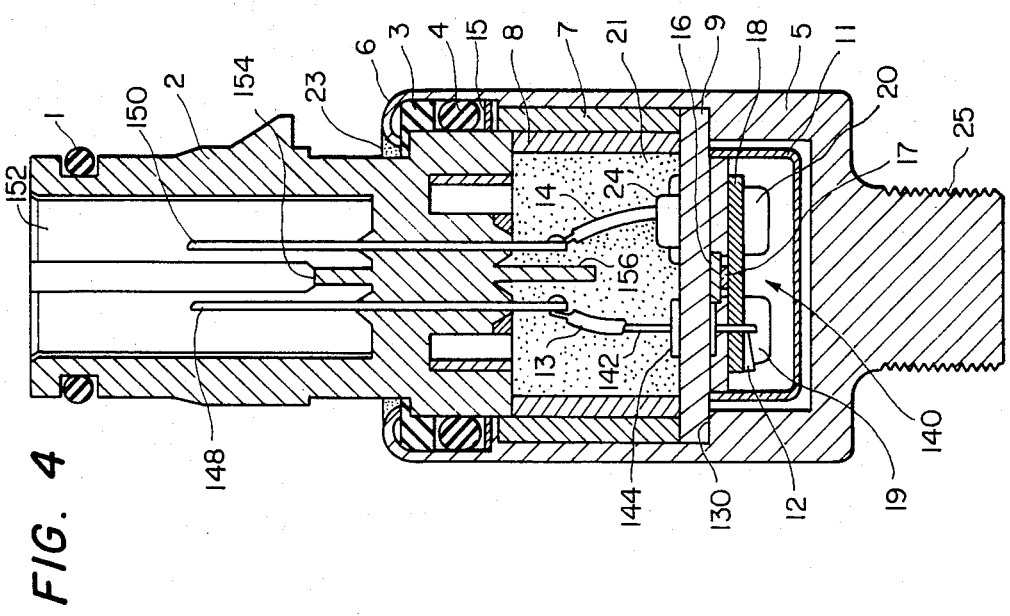

FIGS. 4 and 5 show cross-sectional views of the first embodiment sensor of FIG. 3, and these cross-sectional views are from two angles different by 90 degrees from each other. The casing 5 has a substantially cylindrical bore, in which a shoulder 130 is made in such a manner that the inner diameter of the bore is smaller at a portion close to the bottom of the bore than that at the upper portion of the bore. A pickup assembly generally designated at a reference 140 is received in the bore so that a disk-like base 9 of the pickup assembly 140 is supported on the shoulder 130.

The pickup assembly 140 comprises, in addition to the base 9, a substrate 16 secured on the base 9, a piezoelectric ceramic element 17 fixed on the substrate 16, an element holder 18 placed on the piezoelectric ceramic element 17, screws 19 and 20 for supporting the substrate 16, the piezoelectric ceramic element 17 and the element holder 18 on the base 9. The pickup assembly 140 further comprises a first terminal 142 inserted through a through-hole made in the base 9, a bushing 144 for insulating the first terminal 142 from the base 9, and a second terminal 24 attached to the upper surface of the base 9. One end of the first terminal 142 is connected via a lead wire 12 to the substrate 16 which is electrically connected to one electrode of the piezoelectric ceramic element 17. On the other hand, the second terminal 24 is connected to a portion of the screw 20 which penetrates the base 9. The head of the screw 20 is in contact with the element holder 18 which is electrically connected to the other electrode of the piezoelectric ceramic element 17.

The above-mentioned various elements of the pickup assembly 140 on the lower surface of the base 9 are covered by a cap 11 fixed to the lower surface of the base 9. The pickup assembly 140 is received in the bore so that the periphery of the base 9 is placed on the shoulder 130. Then a ring 7 is inserted into the bore under pressure so that one end of the ring 7 is in contact with the upper surface of the base 9. As a result, the base 9 of the pickup assembly 140 is securely supported in the bore. After the insertion of the ring 7, another ring 8, which is referred to as a connector-receiving ring, having a diameter little smaller than that of the above-mentioned ring 7, is inserted into the ring 7.

The aforementioned connector 2 comprises first and second pins 148 and 150 respectively projecting downward in the direction parallel to the longitudinal axis of the connector 2. The connector 2 has a cylindrical recess 152, and the pins 148 and 150 respectively project upward in the recess 152. A partition 154 is provided in the recess 152 so as to ensure electrical insulation between the pins 148 and 150. Another partition 156 extends downward for the same purpose. The lower ends of the pins 148 and 150 are respectively connected to the lead wires 13 and 14 of the pickup assembly 140 in advance, namely, before the connector 2 is assembled with the casing 5.

After the lead wires 13 and 14 are respectively connected to the terminals 148 and 150, the space around the lead wires 13 and 14 is filled with a suitable filling, such as a synthetic resin. Then the connector 2 will be assembled with the casing 5 in the following manner. Namely, the lower portion of the connector 2 is inserted into the casing 5 until the lower end thereof abuts against the connector-receiving ring 8. Then three rings, i.e. a ring 15, an O-ring 4 and a regulating ring 3 are fitted into the space between the inner wall of the casing 5 and the outer wall of the connector 2 one after another as shown. The above-mentioned bendable portion 6 of the casing 5 is straight, and extends upward in FIGS. 4 and 5 at this time. Then the bendable portion 6 is inwardly bent to securely support the connector 2. After the connector 2 is assembled with the casing 5, a sealing member 23 is attached to the tip portions of the bendable portions 6 so as to isolate the inside of the casing 5 from atmosphere.

When the bendable portion 6 of the casing 5 is bent inward, the connector 2 receives downward force from the tips of the bendable portion 6. However, the lower end of the connector 2 is supported by the connector-receiving ring 8 which prevents the connector 2 from moving toward the pickup assembly 140. As a result, the three rings 15, 4 and 3 are compressed. Therefore, these rings 15, 4 and 3 make an air-tight structure. Accordingly, the knocking sensor according to the present invention is of water-proof.

In practice, the knocking sensor is screwed into a screw hole of an engine first, and then a suitable plug (not shown) will be engaged with the recess of the connector 2, so that the output signal of the pickup assembly is fed via the pins 148 and 150, the plug and via a cable connected to the plug, to a suitable signal processing circuit. The plug may have a portion which will be in contact with the O-ring 1 provided around the connector 2, so that water or the like is prevented from getting in the recess 152.

Reference is now made to FIGS. 6 to 9 which show the second embodiment knocking sensor according to the present invention. FIGS. 6 and 7 are cross-sectional views in the ame manner as FIGS. 4 and 5. FIG. 8 is an enlarged cross-sectional and exploded view of the second embodiment sensor, and FIG. 9 is a top plan view of the base of FIGS. 6 to 8. The second embodiment sensor generally comprises a casing 103 having a nut-like outer shape and a threaded portion 25, and a connector 102 attached to the casing 103. The casing 103 is made of a conductive material, while the connector 102 is made of an insulating material. The second embodiment is different from the above-described first embodiment in that the connector 102 has only a single pin 110, the base 111 which corresponds to the base 9 of FIGS. 4 and 5, is directly attached to the connector 102 corresponding to the connector 2. As best seen in FIG. 8, the single pin 110 is embedded in the connector 102 in such a manner that first and second ends 110A and 110B of the pin 110 are exposed. In detail, the pin 110 has a crank-like shape, and the first end 110A thereof extends in a first recess 150 of the connector 102, while the second end 110B extends in the opposite direction. The connector 102 has a second recess 160 on the other side of the first recess 150 for receiving a portion of the base 111 therein.

Namely, one side of the base 111 has a shape corresponding to the shape of the second recess 160 so that the base 111 can be fitted in the recess 160 when depressed thereagainst. A through-hole 112A is made in the base 111 so that the second end 110B of the pin 110 can be inseted therein when the base 111 is engaged with the second recess 160. The through-hole 112 has a diameter which is larger than the diameter of the second end 110B of the pin 110 so that the second end 110B does not come into contact with the base 111. Although it is not shown in FIG. 8, various elements constituting a pickup assembly are attached to the base 111 in a similar manner as in the first embodiment in advance. However, in this second embodiment, only a single lead wire 117 corresponding to the lead wire 12 of the first embodiment is used. The lead wire 117 is connected, at its one end, to a conductor 200 placed on the substrate 16, and has a C-shaped conductor at the other end. The substrate 16 is made of an insulating material so that the conductor 200 is electrically insulated from the base 111. This conductor 200 is a first electrode of the piezoelectric ceramic element 17. The C-shaped conductor will be connected to the second end 110B of the pin 110 after the base 111 of the pickup assembly, which is designated at a reference 170, is fitted in the second recess 160 of the connector 102. As seen in FIGS. 6, 7 and 9, the piezoelectric ceramic element 17 has the above-mentioned firs electrode 200 and a second electrode 202 at both sides thereof so that a lamination of the first electrode 200, the piezoelectric ceramic element body 17 and the second electrode 202 is interposed between the nonconductive substrate 16 and the pressing plate or element holder 18. The base 111 has a recess (not shown) on one side which is to be received in the recess of the connector 102 so that the base 102 is electrically insulated from a middle portion of the pin 110.

In order to complete a product of the second embodiment sensor, the connector 102 with the pickup assembly 170 is attached to the casing 103 in the same manner as described in connection with the first embodiment. Namely, a bendable portion 106 of the casing 103 is bent to securely attach the connector 102 to the casing 103 after an O-ring 108 and another ring 109 are inserted between the outer wall of the connector 102 and the inner wall of the casing 103. The base 111 is prevented from moving toward the threaded portion 25 of the casing 103 by a shoulder portion 130 made in the bore of the casing 103, and thus the connector 102 is tightly fixed to the casing 103 with the bendable portion 106 bent inward. Therefore, the conductive base 111 is electrically connected to the casing 103 at the shoulder portion 130 of the latter. The screws 19 and 20 are screwed into screw holes made in the base 111 so that the negative terminal or the above-mentioned second electrode 202 of the piezoelectric ceramic element 17 is electrically connected via the element holder 18, the screws 19 and 20, and the base 111 to the casing 103. Therefore, when the knocking sensor of FIGS. 6–9 is engaged with a screw hole of an engine, the negative terminal of the piezoelectric ceramic element 17 is electrically connected to the engine casing, which is electrically grounded in an electrical circuit of a motor vehicle. On the other hand, the positive terminal or the first electrode 200 of the piezoelectric ceramic element 17 is electrically connected via the lead wire 117 to the pin 110, which will be engaged with a suitable plug attached to a connecting cable. The first electrode 200 has an extension extending along the nonconductive substrate 16 as seen in FIGS. 6 and 9.

Although it has been described that the piezoelectric ceramic element 17 has first and second electrodes 200 and 202, the first electrode 200 may be omitted if a conductor is placed on the nonconductive substrate 16 so that electrical connection between the lead wire 117 and the positive terminal is effected. Such a conductor may be a metal piece or conductive film attached or deposited on the nonconductive substrate 16.

From the foregoing description, it will be understood that the knocking sensor according to the present invention comprises a connector which can be electrically connected to a plug after attaching the sensor to an engine. Since the sensor according to the present invention has no cable or code, an impact wrench can be used for installing the sensor, reducing the work time for installation and providing secure attachment of the sensor. Moreover, since the connector of the sensor can be readily attached to the casing of the sensor by simply bending the bendable portion of the casing, the knocking sensors according to the present invention can be readily mass produced. The above described embodiments are just examples of the present invention, and therefore, it will be apparent for those skilled in the art that many modifications and variations may be made without departing from the spirit of the present invention.

What is claimed is:

1. A knocking sensor for converting engine vibrations into an electrical signal, comprising:
    (a) a conductive casing having at its one end a threaded portion engageable with a screw hole of said engine, a nut-like outer portion so that said casing can be readily rotated, and a generally cylindrical bore having an open end at the other end;
    (b) a connector having an insulating hollow cylinder with one end telescopically received in the bore of said casing, said connector having a pin-like conductor with a first portion received within said insulating hollow cylinder so that said first portion of said pin-like conductor is substantially parallel to said insulating hollow cylinder, said pin-like conductor having a second portion extending in a direction opposite to said first portion, said insulating hollow cylinder having an open end at its one end and a closed end at the other side, said closed end having a recess at its outside, said pin-like conductor being partially embedded in said closed end of said insulating hollow cylinder so that said second portion projects into said recess, said connector engaging with said open end of said casing at said closed end;
    (c) a pickup assembly having:
        a conductive base partially received in said recess of said cylinder of said connector so that said base is in contact with said casing, said base having a throughhole, the diameter of which is larger than the diameter of said second portion of said pin-like conductor;
        a nonconductive substrate placed on said base;
        a piezoelectric element having first and second electrodes at both sides thereof, said piezoelectric element being placed on said nonconductive substrate so that said first electrode is in contact with said nonconductive substrate; a conductive pressing plate placed on said second electrode; and at least one screw which secures said piezoelectric element interposed between said nonconductive substrate and said pressing plate onto said conductive base, said screw being screwed into a screw hole made in said base so that said second electrode of said piezoelectric element is electrically connected to said conductive casing via said pressing plate, screw, and base, said first electrode being electrically connected to said pin-like conductor via a first conductor connected between a second conductor, which is electrically connected to said first electrode, and said second portion of said pin-like conductor, which penetrates said base through said throughhole without coming into contact therewith; and
    (d) means for fastening said connector to said casing.

2. A knocking sensor as claimed in claim 1, wherein said means for fastening comprises a plurality of bendable portions which are integrally formed with said casing.

3. A knocking sensor as claimed in claim 1, further comprising air-tightening means for isolating said bore of said casing from atmosphere.

4. A knocking sensor as claimed in claim 1, wherein said bore of said casing has a shoulder portion so that said base is interposed between said shoulder portion and said closed end of said cylinder.

5. A knocking sensor as claimed in claim 1, wherein said air-tightening means comprises an 0-ring provided between the outer surface of said connector and the inner surface of said casing.

6. A knocking sensor as claimed in claim 1, wherein said nonconductive substrate is placed in the vicinity of said through-hole made in said base.

7. A knocking sensor as claimed in claim 6, wherein said second conductor is an extension of said first electrode of said piezoelectric element, said extension extending so that one end of said extension is close to said through-hole.

8. A knocking sensor as claimed in claim 6, wherein said second conductor is a metal piece placed on the surface of said nonconductive substrate, said metal piece extending so that one end thereof is close to said through-hole.

9. A knocking sensor as claimed in claim 6, wherein said second conductor is a conductive film deposited on the surface of said nonconductive substrate, said conductive film extending so that one end thereof is close to said through-hole.

10. A knocking sensor as claimed in claim 1, further comprising an insulating filling filled in said through-hole so that said second portion of said pin-like conductor passing through said through-hole is fixed to be electrically insulated from said base.

11. A knocking sensor as claimed in claim 1, wherein said pin-like conductor is substantially crank-shaped so that said second portion is spaced apart from the center of said base.

* * * * *